April 29, 1924.
R. I. SMITH
PITMAN END
Filed Dec. 4, 1922
1,492,183
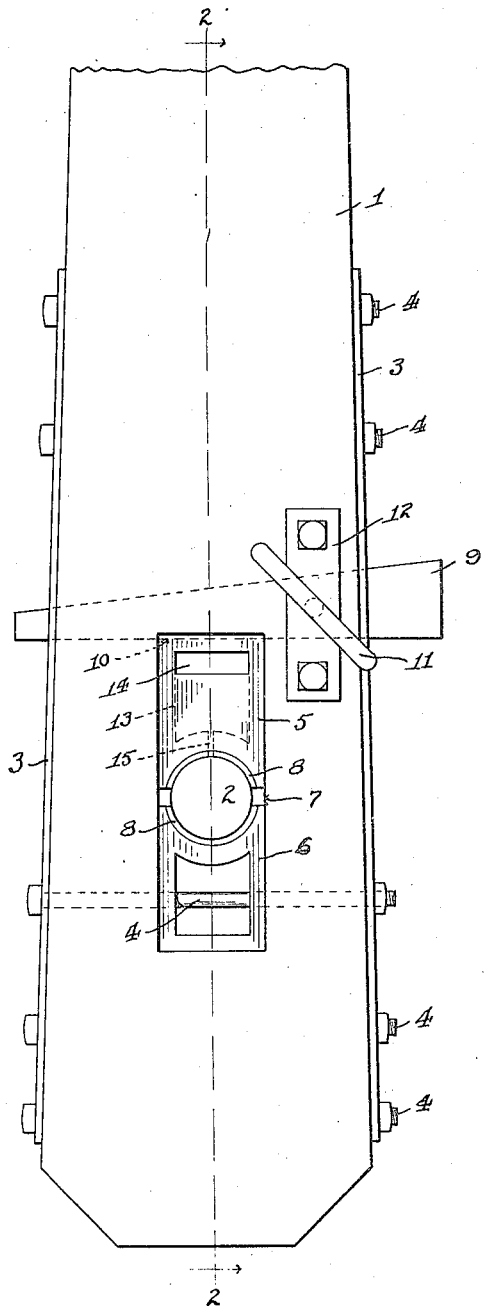
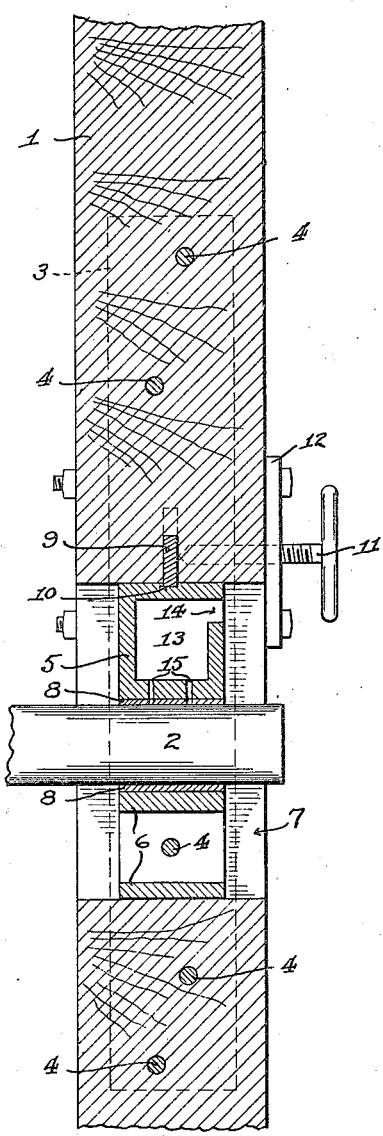
INVENTOR
Robert I. Smith
BY
Booth & Booth
ATTORNEYS Patented Apr. 29, 1924.

1,492,183

UNITED STATES PATENT OFFICE.

ROBERT I. SMITH, OF OIL CENTER, CALIFORNIA.

PITMAN END.

Application filed December 4, 1922. Serial No. 604,765.

*To all whom it may concern:*

Be it known that I, ROBERT I. SMITH, a citizen of the United States, residing at Oil Center, in the county of Kern and State of California, have invented certain new and useful Improvements in Pitman Ends, of which the following is a specification.

My invention relates to a pitman end bearing structure especially adapted for oil well rigs.

The object of my invention is to provide a bearing structure for use in wooden rods, such, for example, as pitman rods, which is self-lubricating, and which can be easily adjusted to compensate for wear of the bearing surfaces, and securely locked in its adjusted position. A further object is to provide such a structure of the necessary strength without adding materially to the cost of manufacture. A still further object is to provide means associated with the bearing structure for reinforcing the end portion of the wooden pitman.

Although my invention will be described in relation to its preferred use as a bearing structure for pitman ends, it will be obvious that it may be applied equally well to any bearing structure of similar type. Moreover, changes, within the scope of the claim hereto appended, may be made in the form and construction of the device without departing from the spirit of the invention.

With this in view, my invention will now be fully described with reference to the accompanying drawings, wherein:

Fig. 1 is a front elevation of my improved pitman end.

Fig. 2 is a section taken in the direction of the arrows on the line 2—2 of Fig. 1.

In the drawings, the reference numeral 1 designates the lower end portion of a wooden pitman and 2 is the crank pin upon which it is journaled. The pitman 1 is reinforced by metal plates 3 secured to its opposite sides by bolts 4, said bolts passing through said pitman. The journal proper comprises upper and lower blocks or boxes 5 and 6 respectively, set in an aperture 7 in the pitman 1. Both blocks are best formed of cast-iron, or other suitable metal, and are provided with the usual Babbitt metal linings 8. The lower block 6 is firmly held in place by having one of the bolts 4 pass through it, as shown. The upper block 5 is movable vertically within the aperture 7 to provide a take-up for the bearing, and is held in its proper position by a tapered metal key 9 passing through the pitman 1 and the side plates 3, and bearing upon the top of said upper block 5, in a shallow groove or guide-way 10. The key 9 is locked in any desired position by a set screw 11 threaded through a plate 12 bolted to the face of the pitman. Thus by loosening the set screw 11 and driving in the key 9, the bearing may be easily taken up, and can then be locked in its adjusted position by the set screw 11.

The upper block 5 is formed with an interior chamber 13 adapted to contain a supply of lubricant, and is provided with an aperture 14 in its face through which the lubricant may be introduced and with holes or ducts 15 through which the lubricant runs down to the bearing surface.

Thus I provide, by means of the chambered upper block 5, a self-lubricating bearing capable of operating for days without attention; also by means of the metal key 9 and its engagement with the side plates 3 and its locking screw 11, a structure is provided which can be easily adjusted and which will not work loose in service; and finally, by means of the side plates 3, and the bolts 4, a reinforcement is furnished for the entire lower end of the pitman 1.

I claim:—

A pitman end having an opening therethrough and adapted to receive a pair of opposing blocks fitted in said opening and co-acting to form a journal for a crank pin, one of said blocks being adjustable, having an interior chamber for holding a supply of lubricant and having a side opening therein and a duct leading from said chamber to the bearing surface of the journal; a pair of plates adapted to be clamped against opposite sides of the pitman; clamping bolts passing through said plates and the pitman, one of said bolts passing through one of said blocks; a tapered key passing through said plates and the pitman for adjusting the position of the chambered block; and a clamping screw for locking said key.

In testimony whereof I have signed my name to this specification.

ROBERT I. SMITH.